United States Patent Office 2,970,174
Patented Jan. 31, 1961

2,970,174

1,1,3-TRI-LOWER ALKOXY-4-METHYL-4-HEPTEN-6-YNE

Otto Isler and Marc Montavon, Basel, Rudolf Rüegg, Bottmingen, Gabriel Saucy, Riehen, Ulrich Schwieter, Basel, and Herbert Lindlar, Reinach, Basel Land, Switzerland, assignors to Hoffmann-La Roche Inc., Nutley, N.J., a corporation of New Jersey No Drawing. Filed Oct. 15, 1958, Ser. No. 767,272

Claims priority, application Switzerland Feb. 14, 1958

2 Claims. (Cl. 260—615)

This invention relates to the production of 15-(2,6,6-trimethyl - 1 - cyclohexen - 1 - yl) - 4,9,13 - trimethyl-2,4,6,8,10,12,14 - pentadecaheptaen - 1 - al. This compound is synthesized, according to the present invention, by condensing, in a metallo organic reaction, 1,1,3-trialkoxy - 4 - methyl - 4 - hepten - 6 - yne with 8 - (2,6,6-trimethyl - 1 - cyclohexen - 1 - yl) - 2,6 - dimethyl - 2,4,6-octatrien-1-al, hydrolyzing the condensation product, then acidifying to obtain 15-(2,6,6-trimethyl-1-cyclohexen - 1 - yl) - 4,9,13 - trimethyl - 2,4,8,10,12,14 - pentadecahexaen-6-yn-1-al which is catalytically hydrogenated and isomerized to yield 15-(2,6,6-trimethyl-1-cyclohexen-1 - yl) - 4,9,13 - trimethyl - 2,4,6,8,10,12,14 - pentadecaheptaen-1-al.

The condensation of the 1,1,3-trialkoxy-4-methyl-4-hepten-6-yne with the aldehyde may be effected by forming a metal derivative of the trialkoxy compound, e.g. a Grignard derivative such as the magnesium alkyl halide reaction product or the lithium reaction product, in an inert solvent and adding the aldehyde. The condensation product is hydrolyzed, without further purification if desired, by means of conventional hydrolyzing agents, for example by pouring over a mixture of ice and dilute ammonium chloride solution. The viscous oil obtained by hydrolysis is then treated with acid whereupon water and alcohol are split off and the acetylenic aldehyde is obtained. The acidification may be effected with an aqueous or anhydrous organic or inorganic acid, for example, acetic acid, p-toluene-sulfonic acid, hydrochloric acid, etc., in an inert organic solvent such as acetone, alcohol, ether and the like.

The triple bond of the acetylenic aldehyde is selectively hydrogenated in the presence of a catalyst, for example, a lead and quinoline deactivated palladium-calcium-carbonate catalyst. The selective hydrogenation generally produces the desired aldehyde with a cis-configuration. If the all-trans-configuration is desired, the product of the selective hydrogenation may be isomerized under mild conditions, e.g. by heating or under the influence of light. Both forms are within the scope of this invention.

The aldehyde which is the product of this invention is useful as a coloring agent for feeds and foodstuffs. In poultry feeds it is useful for obtaining more suitably colored egg yolks and for imparting yellow coloration to skin and shanks.

The 1,1,3-trialkoxy-4-methyl-4-hepten-6-ynes, which are used in the initial condensation step of the process resulting in the end product aldehyde of this invention, constitute a novel group of compounds. They may be produced by reacting 1,1-dialkoxy-2-methyl-2-penten-4-yne with a vinyl alkyl ether such as vinyl ethyl ether in an inert solvent containing zinc chloride and ethyl acetate and then pouring the reaction mixture into a mixture of ice and sodium bicarbonate.

The 1,1-dialkoxy-2-methyl-2-penten-4-ynes also constitute a novel group of compounds. They may be synthesized by condensing an orthoformic acid alkyl ester, such as the ethyl ester, with a propenyl alkyl ether such as propenyl ethyl ether in the presence of boron trifluoride etherate. This reaction yields 1,1,3,3-tetraalkoxy-2-methylpropane which in turn produces methyl-malonaldehyde on acid hydrolysis. Etherification of the latter by azeotropic distillation with benzene and an alkanol in the presence of p-toluenesulfonic acid produces 1-alkoxy-2-methyl-1-propen-3-al. The last named compound is condensed with an alkali metal acetylide or alkaline earth metal acetylide in liquid ammonia. The product of that condensation is treated with an orthoformic acid alkyl ester and a mixture of p-toluene-sulfonic acid and phosphoric acid to obtain the 1,1-dialkoxy-2-methyl-2-penten-4-yne.

In the foregoing discussion the term "alkyl" refers to monovalent straight chain and branched chain aliphatic hydrocarbon groups, preferably lower alkyl groups such as methyl, ethyl, propyl, isopropyl, butyl, isobutyl, amyl and the like. The same meaning is intended in those instances wherein an alkyl group forms part of an ether group referred to by the term "alkoxy."

The following example is illustrative of the invention. All temperatures are stated in degrees centigrade.

*Example*

In a stirring flask 620 cc. of ethyl orthoformate were mixed with 1.6 cc. of boron trifluoride etherate and the mixture was heated to 30°. Into this warm mixture was dropped a mixture of 520 cc. propenyl ethyl ether and 620 cc. of ethyl orthoformate. The exothermic reaction was maintained at a temperature between 30 and 40° adjusting the rate of dropping and, when necessary, by external cooling. After completion of the reaction the solution was washed with aqueous sodium bicarbonate solution, dried with sodium sulfate and subjected to fractional distillation. The excess ethyl orthoformate initially added was reobtained as a fore-run. The resulting 1,1,3,3-tetraethoxy-2-methylpropane boiled at 93–95°/10 mm.; $n_D^{20°}=1.4132$.

2340 g. of 1,1,3,3-tetraethoxy-2-methylpropane were treated with a solution containing 5.4 g. of p-toluenesulfonic acid in 180 g. of water. The mixture was stirred at 80° until the aqueous phase disappeared. The solution was permitted to stand at 80° for 20 hours, then cooled. 50 g. of solid sodium bicarbonate were added and the mixture was stirred for two hours at room temperature. The mixture was filtered, the filtrate was washed with a small amount of absolute ethanol and then fractionated under water vacuum. After evaporation of the alcohol and a forerun comprising about 115 g., there was obtained a principal fraction comprising 3-ethoxy-2-methyl - 2 - propen - 1 - al, B.P. 78–81°/14 mm.; $n_D^{22°}$ =1.4738; U.V. absorption maximum at 242 mμ (in petroleum ether).

A solution of sodium acetylide in 2.5 l. of liquid ammonia was prepared from 50 g. of sodium. Into this solution, 228 g. of 3-ethoxy-2-methyl-2-propen-1-al were dropped over the course of an hour. The material was rinsed out with 10 cc. of absolute ether and the mixture was permitted to react for 10 to 15 hours at the boiling temperature of ammonia. The reaction mixture was carefully treated with 100 g. of ammonium chloride and the ammonia was replaced with ether. The resulting solution was washed with water, dried with sodium sulfate and the solvent was evaporated at 50° in vacuo. 1 - ethoxy - 2 - methyl-3-hydroxy-1-penten-4-yne was obtained as a yellow oil which was purified by distillation, B.P. 630/0.05 mm.; $n_D^{20}=1.4784$.

275 g. of 1-ethoxy-2-methyl-3-hydroxy-1-penten-4-yne were dissolved in a solution of 296 g. of orthoformic acid ethyl ester in 150 cc. of absolute ethanol. The solution was stirred for two hours at 20–25° with a solution of 5 cc. of phosphoric acid and 0.5 g. of p-toluenesulfonic acid in 150 cc. of absolute ethanol with the exclusion of moisture. The mixture was permitted to stand at room temperature overnight, 15 cc. of pyridine were then added with stirring and the mixture was poured into an ice cold solution of sodium bicarbonate. After extraction with petroleum ether (boiling range 40–45°), washing three times with sodium bicarbonate solution, drying with sodium sulfate and potassium carbonate, and concentration in vacuo at 45°, crude 1,1-diethoxy-2-methyl-2-penten-4-yne was obtained as a brown oil. Upon distillation of the latter under nitrogen, a colorless liquid was obtained, B.P. 45–46°/0.1 mm.; $n_D^{20}=1.4520-1.4540$; U.V. absorption maximum at 225 m$\mu$ (in alcohol).

33.6 g. of 1,1-diethoxy-2-methyl-2-penten-4-yne were diluted with 35 cc. of absolute benzene. Over a period of one hour this mixture was treated simultaneously with 15 cc. of a 10% zinc chloride-ethyl acetate solution and a mixture of 17 g. of vinyl ethyl ether in 17 cc. of absolute benzene. The temperature was maintained at 28–30° by cooling strongly. The mixture was permitted to stand overnight at room temperature. 3 cc. of pyridine were added and the reaction solution was poured into a mixture of sodium bicarbonate and ice. After extracting with petroleum ether, washing with sodium bicarbonate solution, drying over potassium carbonate-sodium sulfate and concentrating under water vacuum, crude 1,1,3-triethoxy-4-methyl-4-hepten-6-yne was obtained. The product was purified by distillation under a high vacuum in a nitrogen atmosphere, B.P. 63–64°/0.02 mm.; $n_D^{20}=1.4564$; U.V. absorption maximum at 225 m$\mu$ (in alcohol).

A solution of ethyl magnesium bromide was prepared by reacting 2.7 g. of magnesium, 14 g. ethyl bromide and 30 cc. of absolute ether while cooling with ice. To this solution was added dropwise over a period of 30 minutes, a solution of 24 g. of 1,1,3-triethoxy-4-methyl-4-hepten-6-yne in 30 cc. of absolute ether while stirring, but without cooling. The reaction solution boiled continuously at a slow rate. The solution was then refluxed for 30 minutes and over a period of about 30 minutes, while cooling with water, a solution of 25 g. of 8-(2,6,6-trimethyl - 1 - cyclohexen - 1 - yl) - 2,6 - dimethyl - 2,4,6-octatrien-1-al in 25 cc. of absolute ether was dropped in. The solution was stirred for an additional three hours at room temperature and poured into a mixture of 20 g. of ammonium chloride and ice. The solution was extracted with ether and the ether extract was washed with water, dried with sodium sulfate and evaporated in vacuo at 45° to a volume of approximately 200 cc. The ether extract comprised 15-(2,6,6-trimethyl-1-cyclohexen - 1 - yl) - 4,9,13 - trimethyl - 1,1,3 - triethoxy-4,9,11,13-pentadecatetraen-6-yne [U.V. absorption maxima at 281 and 292 m$\mu$ (in petroleum ether)] which was used directly in the next step.

The ether solution was treated with 20 cc. of 8% alcoholic CHI and 10 g. of sodium sulfate. The solution was permitted to stand overnight at room temperature. The reaction solution was washed with water and sodium bicarbonate solution, dried over sodium sulfate and concentrated in vacuo at 45°. A viscous oil was obtained which was treated with a solution of 40 g. of sodium acetate in 30 cc. of water and 240 cc. of glacial acetic acid. The mixture was heated at 95–100° for four hours under a nitrogen atmosphere. The reaction mixture was then poured onto ice and extracted with ether-petroleum ether. The extract was washed with water and sodium bicarbonate solution and then dried over sodium sulfate. The solvent was evaporated at 45° under water vacuum. The residue was dissolved in 200 cc. of methanol by warming, seeded and permitted to stand overnight at 0°. The crude product was filtered under suction and crystallified from petroleum ether at —10°. The product, 15 - (2,6,6 - trimethyl - 1 - cyclohexen - 1 - yl) - 4,9,13-trimethyl - 2,4,8,10,12,14 - pendadecahexen - 6 - yn - 1-al, melted at 122.5°.

20 g. of 15-(2,6,6-trimethyl-1-cyclohexen-1-yl)-4,9,13-trimethyl - 2,4,8,10,12,14 - pentadecahexaen - 6 - yn-1-al were dissolved in 300 cc. of high boiling petroleum ether. 2 g. of lead poisoned palladium-calcium carbonate catalyst and 0.1 cc. quinoline were added and the mixture agitated in a hydrogen atmosphere until the hydrogen uptake ceased. The catalyst was filtered off and the filtrate was washed twice with 100 cc. portions of 0.5 N sulfuric acid, then with 100 cc. of 5% sodium bicarbonate solution and then with water. After drying with sodium sulfate the solution of crude cis-15-(2,6,6-trimethyl - 1 - cyclohexen - 1 - yl) - 4,9,13 - trimethyl-2,4,6,8,10,12,14-pentadecaheptaen-1-al (absorption maxima at 310 and 431 m$\mu$ in petroleum ether) was heated to boiling in a nitrogen atmosphere for 6 hours. After removal of the solvent in vacuo there was obtained crude all - trans - 15 - (2,6,6 - trimethyl - 1 - cyclohexen - 1-yl) - 4,9,13 - trimethyl - 2,4,6,8,10,12,14 - pentadecaheptaen-1-al which was purified by chromatography with aluminum oxide of activity III. In so doing the crude product was dissolved in petroleum ether and passed through a column of 500 g. of aluminum oxide. Impurities were eliminated with a mixture of petroleum ether and benzene and then the purified all-trans-15-(2,6,6-trimethyl - 1 - cyclohexen - 1 - yl) - 4,9,13 - trimethyl-2,4,6,8,10,12,14-pentadecaheptaen-1-al was eluted with a mixture of 10% diethyl ether in petroleum ether. After distilling off the solvent in vacuo there was thus obtained 17.5 g. of a crude oil; absorption maximum at 436 m$\mu$ $$(E_1^1=2200)$$

in petroleum ether. The product gave a red colored crystalline semicarbazone, M.P. 208–210°; absorption maxima at 432 and 455 m$\mu$ $$(E_1^1=2580, 2210)$$

in ethanol. The deep red oxime, which crystallized from ethanol, melted at 173–175°; absorption maxima at 421 and 443 m$\mu$ $$(E_1^1=2700, 2500)$$

We claim:
1. 1,1,3-tri-lower alkoxy-4-methyl-4-hepten-6-yne.
2. 1,1,3-triethoxy-4-methyl-4-hepten-6-yne.

References Cited in the file of this patent
UNITED STATES PATENTS

| | | |
|---|---|---|
| 2,369,159 | Milas | Feb. 13, 1945 |
| 2,451,737 | Isler | Oct. 19, 1948 |
| 2,657,219 | Isler et al. | Oct. 27, 1953 |
| 2,676,991 | Guntrum et al. | Apr. 27, 1954 |
| 2,676,994 | Burness et al. | Apr. 27, 1954 |
| 2,827,482 | Isler et al. | Mar. 18, 1958 |
| 2,853,512 | Isler et al. | Sept. 23, 1958 |